United States Patent
Yang et al.

(10) Patent No.: US 11,886,307 B2
(45) Date of Patent: Jan. 30, 2024

(54) SITE LOCALITY SUPPORT FOR FILE SERVICES IN A STRETCHED CLUSTER ENVIRONMENT

(71) Applicant: VMware LLC, Palo Alto, CA (US)

(72) Inventors: Yang Yang, Shanghai (CN); Ye Zhang, Shanghai (CN); Wenguang Wang, Santa Clara, CA (US); Haifeng Li, Shanghai (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/467,292

(22) Filed: Sep. 6, 2021

(65) Prior Publication Data

US 2023/0021195 A1 Jan. 19, 2023

(30) Foreign Application Priority Data

Jul. 19, 2021 (WO) ................ PCT/CN2021/107012

(51) Int. Cl.
*G06F 11/20* (2006.01)
*G06F 16/182* (2019.01)
*G06F 11/14* (2006.01)

(52) U.S. Cl.
CPC ...... *G06F 11/2007* (2013.01); *G06F 11/1423* (2013.01); *G06F 11/2028* (2013.01); *G06F 11/2094* (2013.01); *G06F 16/1834* (2019.01); *G06F 2201/85* (2013.01)

(58) Field of Classification Search
CPC ............. G06F 11/2007; G06F 11/1423; G06F 11/2028; G06F 11/2094; G06F 16/1834; G06F 2201/85
See application file for complete search history.

(56) References Cited

U.S. PATENT DOCUMENTS

| | | | |
|---|---|---|---|
| 2015/0134723 A1* | 5/2015 | Kansal | G06F 11/3419 709/203 |
| 2017/0052707 A1* | 2/2017 | Koppolu | G06F 3/0683 |
| 2021/0303423 A1* | 9/2021 | MacCarthaigh | G06F 11/2025 |

OTHER PUBLICATIONS

Duncan Epping, "vSAN File Services and Stretched Clusters!", available at <URL: https://www.yellow-bricks.com/2021/03/29/vsan-file-services-and-stretched-clusters/>, Mar. 29, 2021, 8 pages.

* cited by examiner

*Primary Examiner* — Bryce P Bonzo
*Assistant Examiner* — Michael Xu
(74) *Attorney, Agent, or Firm* — King Intellectual Asset Management (57) ABSTRACT

The location of resources for file services are located within the same site, thereby eliminating or reducing performance issues caused by cross-site accesses in a stretched cluster environment. A file server placement algorithm initially places file servers at a site based at least in part on host workload and affinity settings, and can perform failover to move the file servers to a different location (e.g., to a different host on the same site or to another site) in the event of a failure of the host where the file servers were initially placed. File servers may be co-located with clients at a location based on client latencies and site workload. Failover support is also provided in the event that the sites in the stretched cluster have different subnet addresses.

21 Claims, 7 Drawing Sheets

SITE LOCALITY SUPPORT FOR FILE SERVICES IN A STRETCHED CLUSTER ENVIRONMENT

CROSS-REFERENCE TO RELATED APPLICATION

The present application claims the benefit of Patent Cooperation Treaty (PCT) Application No. PCT/CN2021/107012, filed Jul. 19, 2021, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

A software-defined approach may be used to create shared storage for VMs and/or some other types of clients, thereby providing a distributed storage system in a virtualized computing environment. Such software-defined approach virtualizes the local physical storage resources of each of the hosts and turns the storage resources into pools of storage that can be divided and accessed/used by VMs or other types of clients and their applications. The distributed storage system typically involves an arrangement of virtual storage nodes that communicate data with each other and with other devices.

One type of virtualized computing environment that uses a distributed storage system is a hyperconverged infrastructure (HCI) environment, which combines elements of a traditional data center: storage, compute, networking, and management functionality. HCI environments may be configured as a stretched cluster, wherein hosts of a cluster are deployed in separate geographic locations, such as hosts of a first site being at a first geographic location and hosts of a second site being at a second geographic location.

In a stretched cluster configuration, the access/data workflow for file services (e.g., for a client to read/write/modify files, data, objects, etc. in the distributed storage system) typically needs to traverse between sites at the different geographic locations. This cross-site workflow is inefficient (e.g., causes performance issues).

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

The present disclosure addresses the drawbacks associated with cross-site workflows when providing file services in stretched cluster environments. The embodiments described herein align the location of the resources for file services within the same site, thereby eliminating or reducing performance issues caused by cross-site accesses. A file server placement algorithm initially places file servers at a site based at least in part on host workload and affinity settings, and can perform failover to move the file servers to a different location (e.g., to a different host on the same site or to another site) in the event of a failure of the host where the file servers were initially placed.

Various embodiments also place file servers at a location based on client latencies and cluster and/or site workload. Still further embodiments address failover in the event that the sites in the stretched cluster have different subnet addresses.

Computing Environment

In some embodiments, the site locality techniques described herein may be implemented for a distributed storage system provided in a virtualized computing environment (such as a HCI environment) having stretched clusters, wherein the distributed storage system includes clusters of virtual storage nodes and/or hosts. In other embodiments, the site locality techniques may be implemented for a file servers associated with a storage system provided in other types of computing environments (which may not necessarily involve a virtualized computing environment), such as a storage system having clusters of one or more physical storage devices. For the sake of illustration and explanation, the various embodiments will be described below in the context of storage nodes and file servers used in connection with a distributed storage system provided in a virtualized computing environment having stretched clusters.

Figure 1:
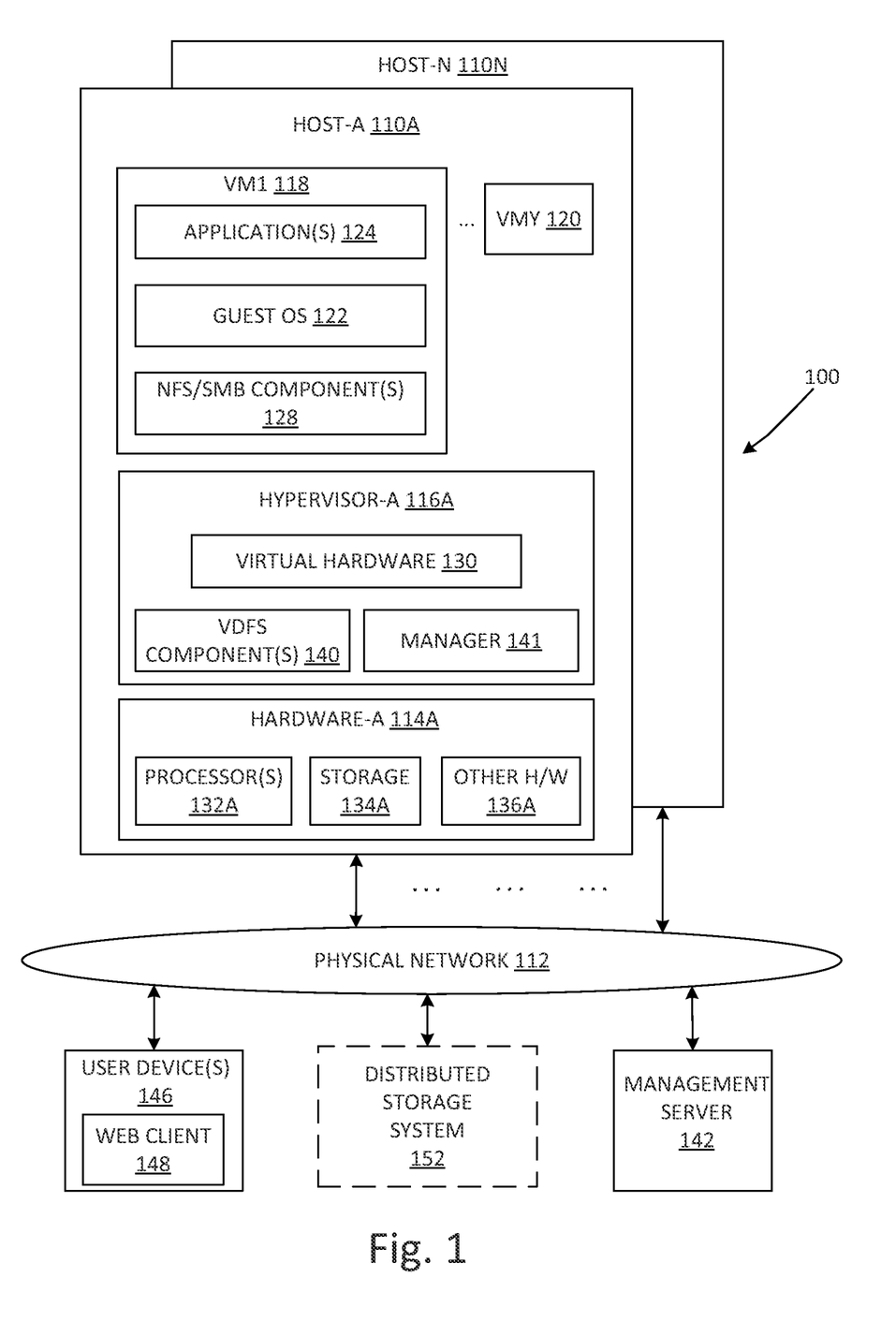
FIG. 1 is a schematic diagram illustrating an example virtualized computing environment that can implement site locality support for file services in a stretched cluster.

Various implementations will now be explained in more detail using FIG. 1, which is a schematic diagram illustrating an example virtualized computing environment 100 that can provide distributed storage functionality. More specifically, FIG. 1 is a schematic diagram illustrating an example virtualized computing environment 100 that can implement site locality support for file services in a stretched cluster. Depending on the desired implementation, the virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMY 120, wherein Y (as well as N) is an integer greater than or equal to 1. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 are shown and described herein.

VM1 118 may include a guest operating system (OS) 122 and one or more guest applications 124 (and their corresponding processes) that run on top of the guest operating system 122. VM1 118 may include still further other elements, such as a virtual disk, agents, engines, modules, and/or other elements usable in connection with operating VM1 118. In some implementations, VM1 118 and/or other virtualized computing instances (including containers) running on host-A 110A may include/run file server components 128, such as network file system (NFS) and server messaging protocol (SMB) file server(s) which will be described in further detail later below.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A of some implementations may include/run one or more virtual distributed file system (VDFS) components 140, such as a VDFS proxy and a VDFS server, which will be described in further detail below. According to various implementations, a VDFS server may be or may provide a service that serves an actual file system access request and may be resident on the same host as an underlying storage object. A VDFS proxy may be or may provide a service that proxies the file system access request to the actual VDFS server.

The hypervisor-A 116A of various implementations may include a manager 141, which may be embodied as one or more of a server/service, controller, agent, module, etc. that is configured to orchestrate balancing operations between hosts (having hypervisors) in the stretched cluster environment, and/or to perform other operations associated with managing the stretched cluster including operations such as those described herein that involve site locality support for file services.

The hypervisor-A 116A may include or may operate in cooperation with still further other elements residing at the host-A 110A. Such other elements may include drivers, agent(s), daemons, engines, virtual switches, and other types of modules/units/components that operate to support the functions of the host-A 110A and its VMs.

Hardware-A 114A includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource(s) 134A of the host-A 110A and the corresponding storage resource(s) of each of the other hosts) can be aggregated together to form a shared pool of storage in the distributed storage system 152 that is accessible to and shared by each of the host-A 110A . . . host-N 110N, and such that virtual machines supported by these hosts may access the pool of storage to store data. In this manner, the distributed storage system 152 is shown in broken lines in FIG. 1, so as to symbolically convey that the distributed storage system 152 is formed as a virtual/logical arrangement of the physical storage devices (e.g., the storage resource(s) 134A of host-A 110A) located in the host-A 110A . . . host-N 110N. However, in addition to these storage resources, the distributed storage system 152 may also include stand-alone storage devices that may not necessarily be a part of or located in any particular host.

The storage devices in the host-A 110A and/or in the distributed storage system 152 store files, data, objects, etc. that may all be collectively and generically referred to herein as a storage object. Such storage objects can be accessed (including operations to read/write/modify), can be shared (e.g., file share), etc. via a workflow that traverses the NFS/SMB component(s) 128 and the VDFS component(s) 140.

A management server 142 or other management entity of one embodiment can take the form of a physical computer with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100 (including managing the operation of and accesses to the distributed storage system 152).

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMY 120 (including operating the applications 124), using a web client 148. The user device 146 can be in the form of a computer, including desktop computers and portable computers (such as laptops and smart phones). In one embodiment, the user may be an end user or other consumer that uses services/components of VMs (e.g., the application 124, file share or file server functionality, etc.) and/or the functionality of the distributed storage system 152. The user may also be a system administrator that uses the web client 148 of the user device 146 to remotely communicate with the management server 142 via a management console for purposes of performing management operations.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Cross-Site Workflow/Access Versus Local Workflow/Access

In a stretched cluster environment, hosts of a cluster are deployed in separate geographic locations, such as hosts of a first site being deployed at a first geographic location and hosts of a second site being deployed at a second geographic location. Cross-site workflows/accesses of storage objects occur in such stretched cluster environments, such as depicted in FIG. 2.

Figure 2:
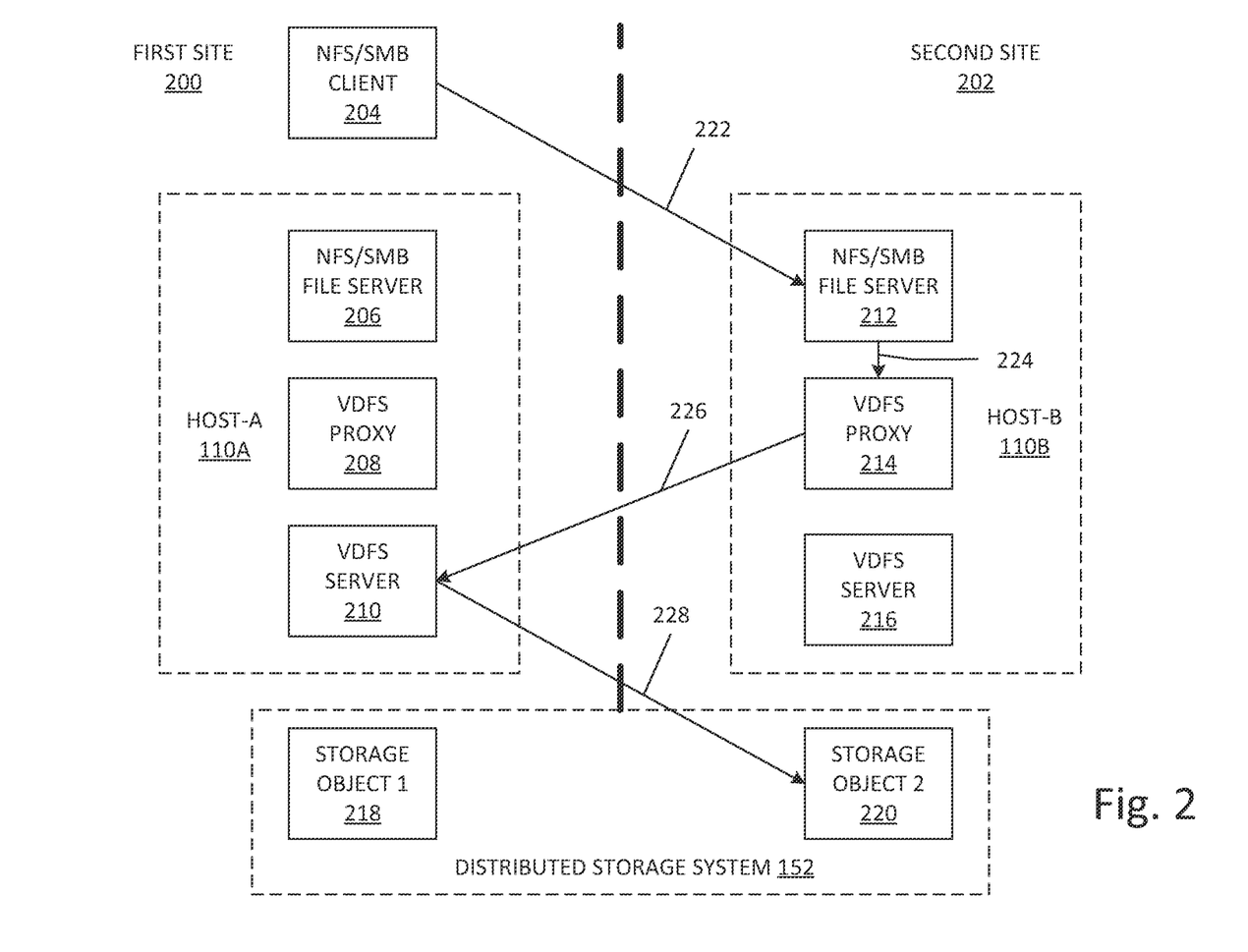
FIG. 2 is a schematic diagram illustrating an example of a cross-site workflow.

More specifically, FIG. 2 is a schematic diagram illustrating an example of a cross-site workflow involving access to storage objects. As depicted in FIG. 2, the host-A 100A is one of the hosts of the cluster and is deployed at a first site 200 at a first geographic location. Another host of the cluster (e.g., host-B 110B) is deployed at a second site 202 at a second geographic location that is different/remote from the first geographic location 200.

A NFS/SMB client 204 (which may correspond to the user device 146 shown in FIG. 1) may be located at the first geographic location of the first site 200. The host-A 110A at the first site 200 may run a virtualized computing instance (such as a VM or container) that provides a NFS/SMB file server 206 (corresponding to the NFS/SMB component(s) 128 in FIG. 1). The hypervisor-A 116A of host-A 110A may also operate or have resident therein a VDFS proxy 208 and a VDFS server 210 (both of which correspond to the VDFS components 140 shown in FIG. 1).

Analogously, the host-B 110B at the second site 202 may run a virtualized computing instance (such as a VM or container) that provides a NFS/SMB file server 212. The hypervisor of host-B 110B may also operate or have resident therein a VDFS proxy 214 and a VDFS server 216.

With respect to the storage objects stored in the distributed storage system 152, a first storage object 218 may be stored at a storage device located at the first site 200, and a second storage object 220 may be stored at a storage device located at the second site 202. Through file server and/or file share operations, the NFS/SMB client 204 is able to access (e.g., for reading, writing, modifying, sharing, etc.) target storage objects that are stored in the distributed storage system 152.

In a stretched cluster configuration, there are multiple software layers that are stacked to provide file services functionality. In the example of FIG. 2, such file service layers include the NFS/SMB file servers, the VDFS proxies, and the VDFS servers in the vertical data workflow direction. For instance, when the NFS/SMB client 204 attempts to access a storage object in the distributed storage system 152, the access workflow path/direction proceeds through a NFS/SMB file server, then to a VDFS proxy, then to a VDFS server, and then to the storage object.

However, such access workflow may go through different sites, specifically traversing between the first site 200 and the second site 202. In the example of FIG. 2, the access workflow from the NFS/SMB client 204 thus includes a first cross-site access 222 from the NFS/SMB client 204 to the NFS/SMB file server 212 at the second site 202. The access workflow may then be followed by a local access 224 from the NFS/SMB file server 212 to the VDFS proxy 214.

The access workflow may then be followed by another cross-site access 226 from the VDFS proxy 214 to the VDFS server 210 at the first site 200. The access workflow may then be followed by yet another cross-site access 228 from the VDFS server 210 to the second storage object 220 located at the second site 202.

Figure 3:
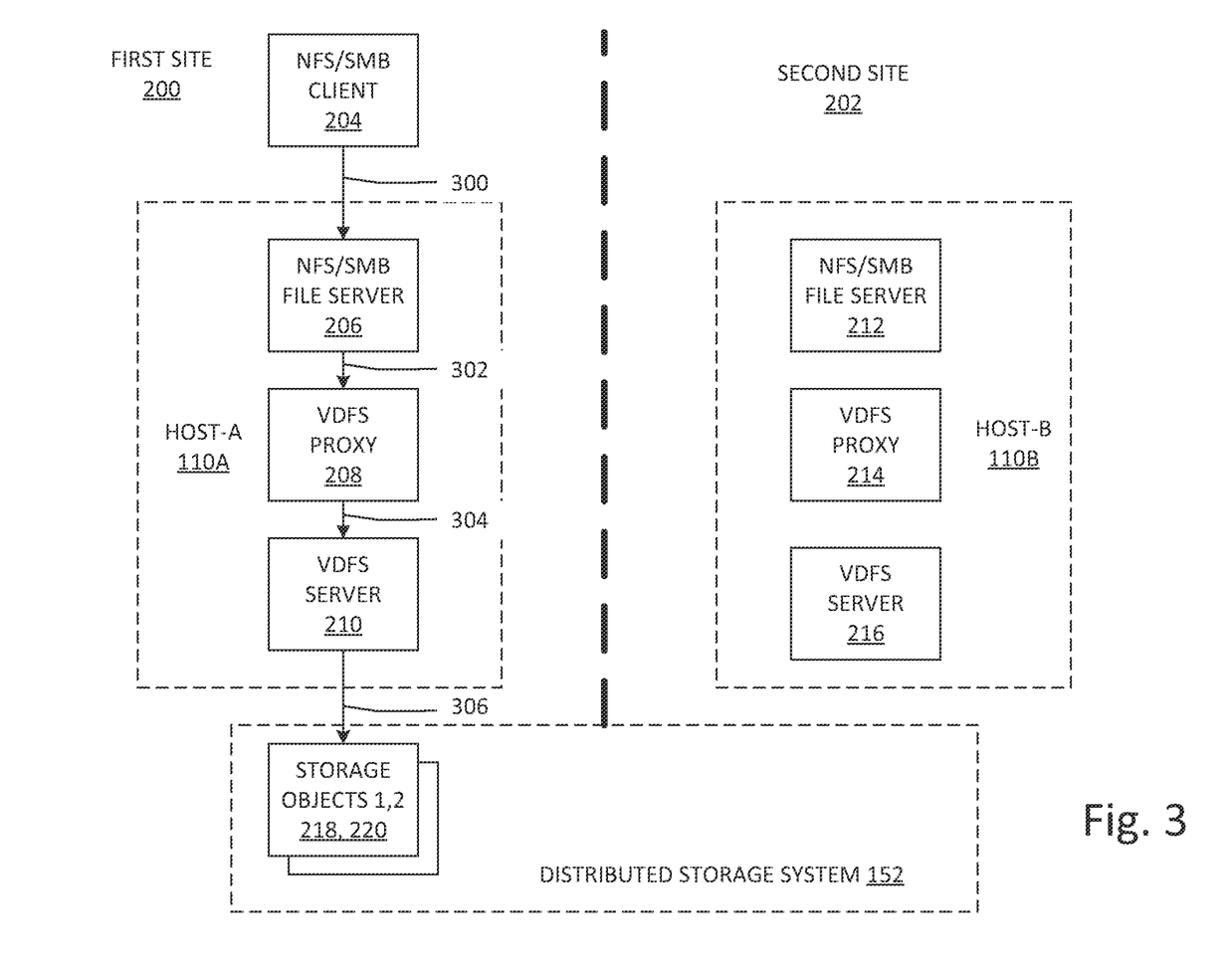
FIG. 3 is a schematic diagram illustrating an example of a workflow with site locality that can be implemented in the virtualized computing environment of FIG. 1.

To address the inefficiencies and performance issues associated with the cross-site accesses shown in FIG. 2, the embodiment depicted in FIG. 3 provides file server (including file share) placement locally within a site. Specifically, FIG. 3 is a schematic diagram illustrating an example of a workflow with site locality that can be implemented in the virtualized computing environment 100 of FIG. 1. Similar components such as those shown in FIGS. 1 and 2 are labeled similarly in FIG. 3.

As depicted in FIG. 3, the location of the underlying file server layers (e.g., the NFS/SMB file server 206, the VDFS proxy 208, the VDFS server 210, and the second storage object 220) are aligned to the same site (e.g., the first site 200 at the first geographic location). Thus, the access workflow from the NFS/SMB client 204 at the first geographic location to the second storage object 220 will involve local access operations (such as shown at 300-306) within the first site 200, without (or reduced) cross-site accesses to the second site 202.

According to various embodiments, the locations of the underlying file server layers (e.g., data path components such as the NFS/SMB file server 206, the VDFS proxy 208, the VDFS server 210, and the second storage object 220) are all within the same site. For instance, such file server layers may be located in the same host in the same site, or in different hosts in the same site. In other implementations, there may be a relatively smaller number/subset of the underlying file server layers that are located at a different site, thereby resulting in less than 100 percent locality at a single site but nevertheless providing a reduced number of cross-site accesses as compared to what is shown in FIG. 2.

The NFS/SMB client 204 and/or the target storage object may be located in the same geographic location as the first site 200 having the host-A 110A with the locally placed file server components, such as depicted in FIG. 3. In other embodiments, the NFS/SMB client 204 and/or the target storage object may be located at a different geographic location than the host-A 110A having the locally placed file server components.

Further details of the site locality implementation of FIG. 3 will be described next below, including an automated file server algorithm based at least in part on host workload (along with failover support), file server auto-placement based on client latencies and host workload, and failover support for layer 3 (L3) network implementations.

File Server Placement Algorithm

Figure 4:
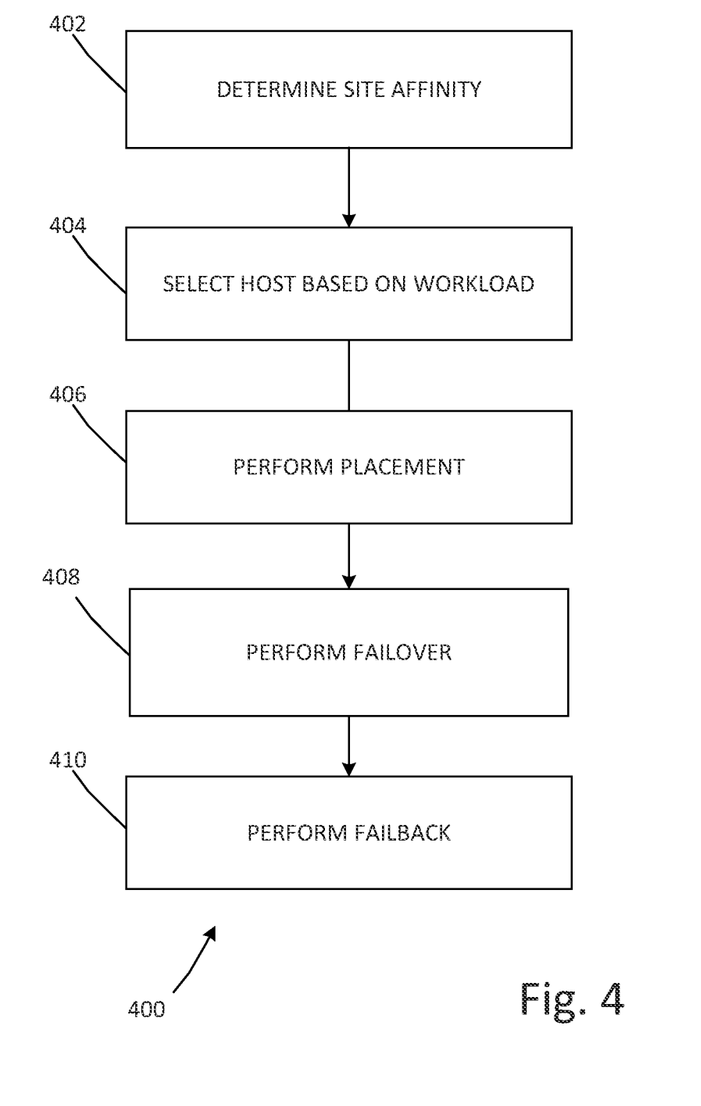
FIG. 4 is a flowchart of an example file server placement method that may be performed in the virtualized computing environment of FIG. 1.

FIG. 4 is a flowchart of an example file server placement method 400 that may be performed in the virtualized computing environment 100 of FIG. FIG. 1. For instance, the method 400 may be an algorithm performed at least in part by an arbitrator host to place file server layers (e.g., data path components) within the same site in a stretched cluster environment, such as depicted in FIG. 3.

The arbitrator host may be, for example, a host in the cluster, and may be located either at the first site 200 or at the second site 202. The arbitrator host of one embodiment may be configured to orchestrate the placement of the file server layers during initial deployment, to monitor host health status for possible failovers, to orchestrate the migration of file server layers from one host to another host during a failover, to orchestrate the migration of file servers back to their previous host during a failback, and/or to perform other operations associated with supporting site locality for file services (including file shares) for a workflow path.

According to some embodiments, the arbitrator host may be configured to perform most or all of the operations of the method 400. In other embodiments, the arbitrator host may perform at least some of the operations of the method 400 in cooperation with the management server 142. In still other embodiments, the method 400 may be performed by the management server, without substantial involvement by any arbitrator host. For purposes of explanation and illustration herein, the method 400 and the other methods disclosed herein will be described in the context of being performed by the arbitrator host, such as by the manager 141 in the hypervisor of the arbitrator host and/or by some other component of the arbitrator host.

The example method 400 may include one or more operations, functions, or actions illustrated by one or more blocks, such as blocks 402 to 410. The various blocks of the method 400 and/or of any other process(es) described herein may be combined into fewer blocks, divided into additional blocks, supplemented with further blocks, and/or eliminated based upon the desired implementation. In one embodiment, the operations of the method 400 and/or of any other process(es) described herein may be performed in a pipelined sequential manner. In other embodiments, some operations may be performed out-of-order, in parallel, etc.

The method 400 may begin at a block 402 ("DETERMINE SITE AFFINITY"), wherein for an initial placement, the arbitrator host determines whether a file server layer (e.g., a NFS/SMB file server) has been created with a specific site affinity setting. Example site affinity settings can be preferred (corresponding to the first site 200) or secondary (corresponding to the second site 202). It is noted that the terms primary and secondary do not necessarily mean a master/backup relationship—a file server can be deployed at a secondary site, for example, if the secondary site provides locality and desired performance characteristics for a NSB/SMB client. Another example affinity setting could be either (or none), in which case the file server can be placed at any site since the file server (or more precisely, the user that created the file server) does not care where the file server is placed. According to various embodiments, the file servers will run on the hosts within a specific site, and the file share will be served by a corresponding file server as well.

The block 402 may be followed by a block 404 ("SELECT HOST BASED ON WORKLOAD"), wherein for file servers with preferred or secondary site affinity settings, the arbitrator host selects a host in the affinity site that has the lightest workload in that affinity site. Using FIG. 3 as an example, the arbitrator host might determine that host-A 110A has the lightest workload in the first site 200 and that the NFS/SMB file server 206 has been configured with a preferred site affinity (which corresponds to the first site 200). Thus, the arbitrator host places the NFS/SMB file server 206 at the host-A 110A, and also automatically places or designates the VDFS proxy 208 and the VDFS server 210 at the host-A 110A for the access workflow path from the NFS/SMB client 204 to the second storage object 220.

According to one embodiment, the workload at a host may be calculated by the arbitrator host based on the number of file shares being handled by the host. Other criteria for calculating the workload, additionally or alternatively to file shares, may be used.

If the file server is created with no affinity (corresponding to an either configuration), then the arbitrator host of one embodiment selects a host with the lightest workload in the cluster, so as to provide workload balancing. Thus, the selected host (where the file server and its associated vertical layer components are to be placed) can be located in either the first site 200 or in the second site 202.

The block 404 may be followed by a block 406 ("PERFORM PLACEMENT"), wherein the file server(s) is placed at the selected host(s) of the affinity site. This placement may be the initial placement using the steps described above, or some other file server placement that is subsequently performed.

In various embodiments, all hosts in the cluster (e.g., in both the first site 200 and the second site 202) report their health status to the arbitrator host, so that the arbitrator host can monitor the health of the hosts. The health status may be reported every 5 seconds, for example, or some other time frame. At a block 408 ("PERFORM FAILOVER"), the arbitrator host determines that one or more hosts is down, and so the file server layers located at that failed host(s) need to be migrated/moved to another host.

According to some embodiments, if a host is down or has some problems such as a network failure, virtual machine infrastructure error, protocol error etc., then the file servers on that host will failover to the lightest workload host within the same affinity site. Thus, as an example, if host-A 110A fails, then the arbitrator host migrates the file servers (including vertical workflow components) on host-A 110 to another host in the same first site 200. However, if the site affinity setting of the file servers on the failed host is either, the arbitrator host will find the lightest workload host in the whole cluster and migrate such file servers to that lightest workload host, which could in some instances be located at a different site than the failed host.

In a situation where all hosts within an affinity site are down or have problems, the file servers on the hosts will be moved by the arbitrator host to the other site. Thus, for example, if all hosts in the first site 200 are down, then the arbitrator host moves all of the file servers at these hosts to the hosts at the second site 202. Which hosts at the second site 202 will accept the migrating file servers can be based on criteria such as workload at the host.

The block 408 may be followed by a block 410 ("PERFORM FAILBACK"), wherein the arbitrator host moves back at least some of the file servers to their previous host(s), when such host(s) becomes active again (e.g., is restored to its operational state). According to some embodiments, once there is a host coming back online, the file servers, which can be substantially transparently failed over from one site to another site, may directly fail back to the previous host (e.g., migrated back to the previous host at the previous site by the arbitrator host). NFS file shares are one example that can be failed back to the previous host/site.

In some embodiments wherein failover and/or fail back of some types of file servers/file shares are unable to be performed substantially transparently, such conditions can be reported via a health check or other mechanism. For example, for file servers with SMB file shares, such file servers may not be moved back to the previous host, due at least in part to the complexity of SMB file shares (and/or other types of file shares) relative to NFS file shares (and/or other types of file shares) and the potentially disruptive nature of the file server (file share) migration. In some embodiments, guardrail features may be provided with respect to SMB file server (and/or other type of file server) migration. For example, a health check user interface (UI) on the web client 148 in FIG. 1 can be provided with a remediation command/button, so that a SMB file share migration to/from a host can be user-initiated with a user-defined guardrail that specifies an amount of disruption that may be tolerated before triggering a remediation action. An example of a remediation action may include, for example, using some other SMB file server instead of attempting to migrate the SMB file server to/from a host.

File Server Auto-Placement Based on Client Latencies (and Workload)

Figure 5:
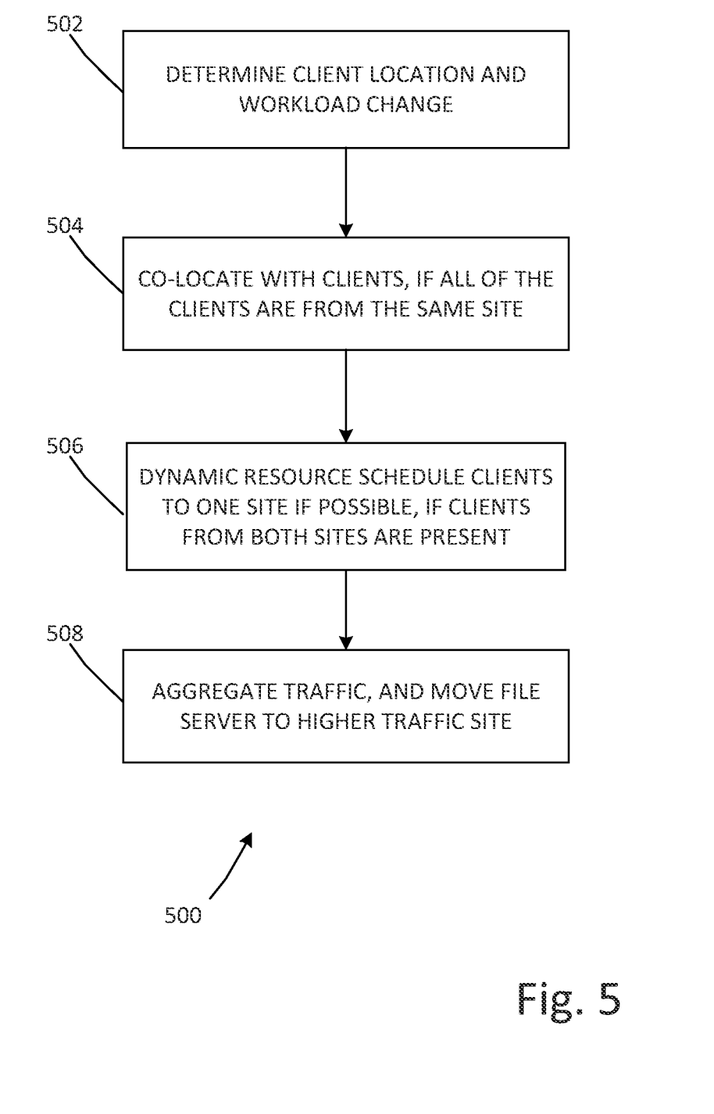
FIG. 5 is a flowchart of an example file server placement method based on client latencies that may be performed in the virtualized computing environment of FIG. 1.

According to various embodiments, a file server auto-placement method based on client latencies may be performed to more optimally co-locate clients (e.g., the NFS/SMB client 204) and file servers. FIG. 5 is a flowchart of an example file server placement method 500 based on client latencies that may be performed in the virtualized computing environment 100 of FIG. 1, in a stretched cluster implementation.

The method 500 may begin at a block 502 ("DETERMINE CLIENT LOCATION AND WORKLOAD CHANGE"), wherein the arbitrator host first determines that all of the addresses (such as internet protocol (IP) addresses) of the clients are from the cluster. Next, the arbitrator host detects which site (e.g., the first site 200 or the second site 202) where the client IP addresses reside.

At the block 502, the arbitrator host then makes a determination as to the site workload change that will result from movement/placement of the file servers (file shares). For example, if the movement of the file servers to a site will not enlarge the workload at the site by more than a standard deviation, or if the movement of the file servers to a site will effectuate a change in workload of 20% (for example) or less, then the arbitrator host may follow certain rules to determine where to move/place the file servers (file shares). It is understood that the various rules described below are merely examples, and that certain rules may be implemented or not implemented based on factors/circumstances, such as complexity, desired performance characteristics, architectural layout and configuration, etc.

As an example rule, if all of the clients are from the same site, then the arbitrator host moves the file servers to a host at the same site, so as to be co-located with the clients at the same site, at a block 504 ("CO-LOCATE WITH CLIENTS, IF ALL OF THE CLIENTS ARE FROM THE SAME SITE").

As another example rule, if clients from both sites are present, then all of the clients are dynamically resource scheduled to a single site if possible, at a block 506 ("DYNAMIC RESOURCE SCHEDULE CLIENTS TO ONE SITE IF POSSIBLE, IF CLIENTS FROM BOTH SITES ARE PRESENT"). Then, the file server (file share) is moved so as to be co-located with the clients when there is no open file handle in this file share.

If the preceding rule fails, then in still another example rule, the arbitrator host aggregates all traffic from each site, at a block 508 ("AGGREGATE TRAFFIC, AND MOVE FILE SERVER TO HIGHER TRAFFIC SITE"). Whichever of these sites is determined to be the higher/highest traffic site will have the file server (file share) moved to it by the arbitrator host once there is no open file handles.

Failover for Layer 3 (L3) Networking

One complication with handling failovers (e.g., to move a container or other virtualized computing instance that runs a file server, to another host) is that the IP address of the container may be incompatible with the IP addressing at the host to which the file server will be migrated. For example, the container's IP address might only be able to work in one site with a specific subnet, and when the container (file server) fails over to the other site, the container's IP address will not work at the other site.

Figure 6:
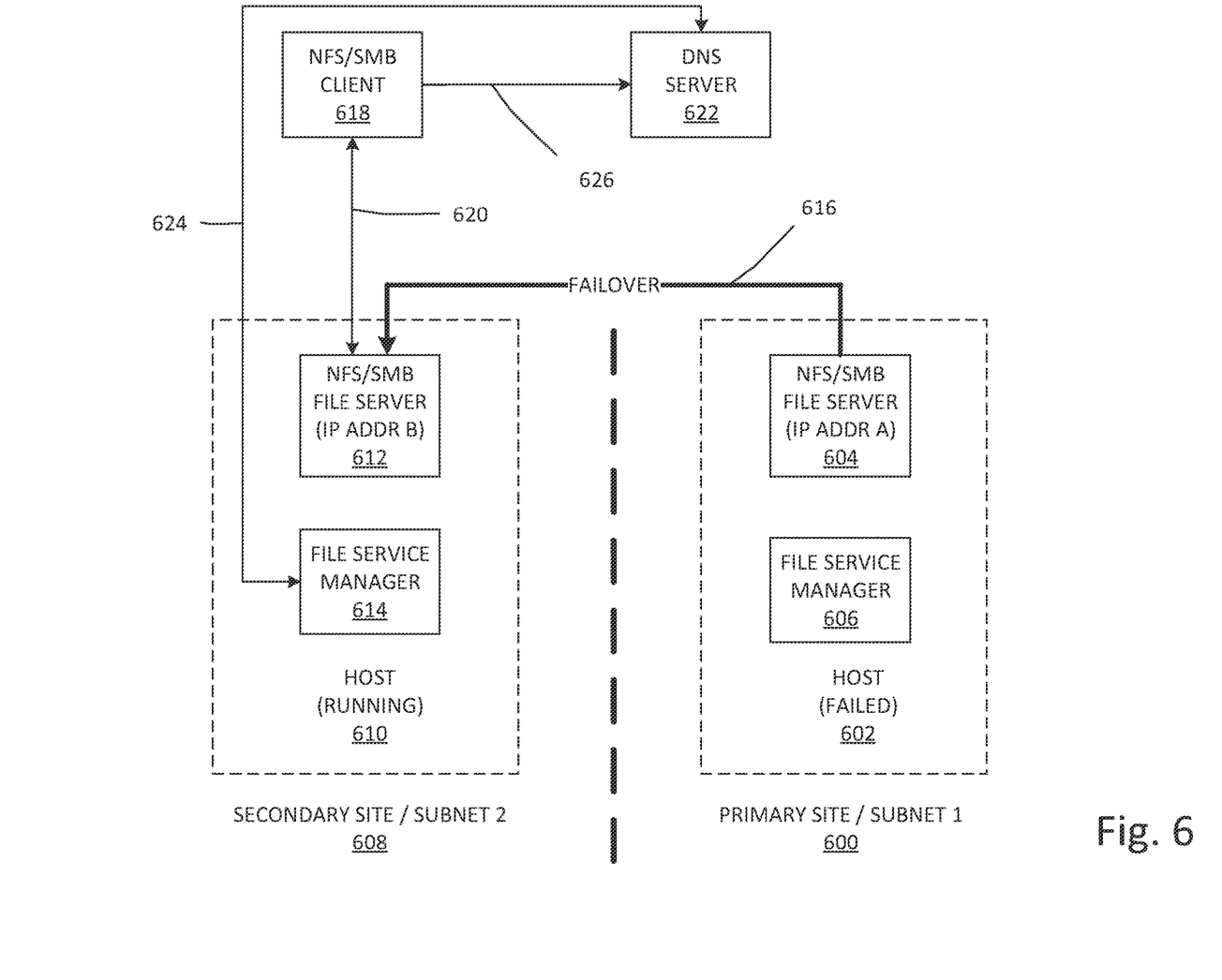
FIG. 6 is a schematic diagram illustrating failover support for layer 3 (L3) networking.

To address at least the foregoing drawback, a dynamic domain name system (DDNS)-based solution may be used in some embodiments to enable a client to access the migrated file server. Referring to FIG. 6, FIG. 6 is a schematic diagram illustrating failover support for layer 3 (L3) networking.

In FIG. 6, a primary site 600 (at an IP address subnet 1) includes a host 602. Running at the host 602 is a NFS/SMB file server 604 (having an IP address A) and a file service manager 606. Analogously, a secondary site 608 (at an IP address subnet 2) includes a host 610. Running at the host 610 is a NFS/SMB file server 612 (having an IP address B) and a file service manager 614.

The host 602 at the primary site 600 has failed, thereby triggering a failover (e.g., a migration depicted at 616) of the NFS/SMB file server 604 to the host 610 at the secondary site 608. As previously explained above, such a migration may typically result in a NFS/SMB client 618 being unable to access the migrated NFS/SMB file server 604 at the secondary site 608, since the IP address A of the NFS/SMB file server 604 would not work at the subnet 2 of the secondary site 608.

However, with the L3 failover support provided by various embodiments, the DDNS-based solution enables the NFS/SMB client 618 to access (shown at 620 in FIG. 6) the NFS/SMB file server 604 (file share) at the secondary site 608 using the DNS name instead of IP addresses (e.g., IP addresses A or B). The DNS record at a DNS server 622 is updated (shown at 624 in FIG. 6) by a DDNS client in the file service manager 614 during the failover, so as to enable the NFS/SMB client 618 to lookup (shown at 626 in FIG. 6) the file server using the DNS name.

Figure 7:
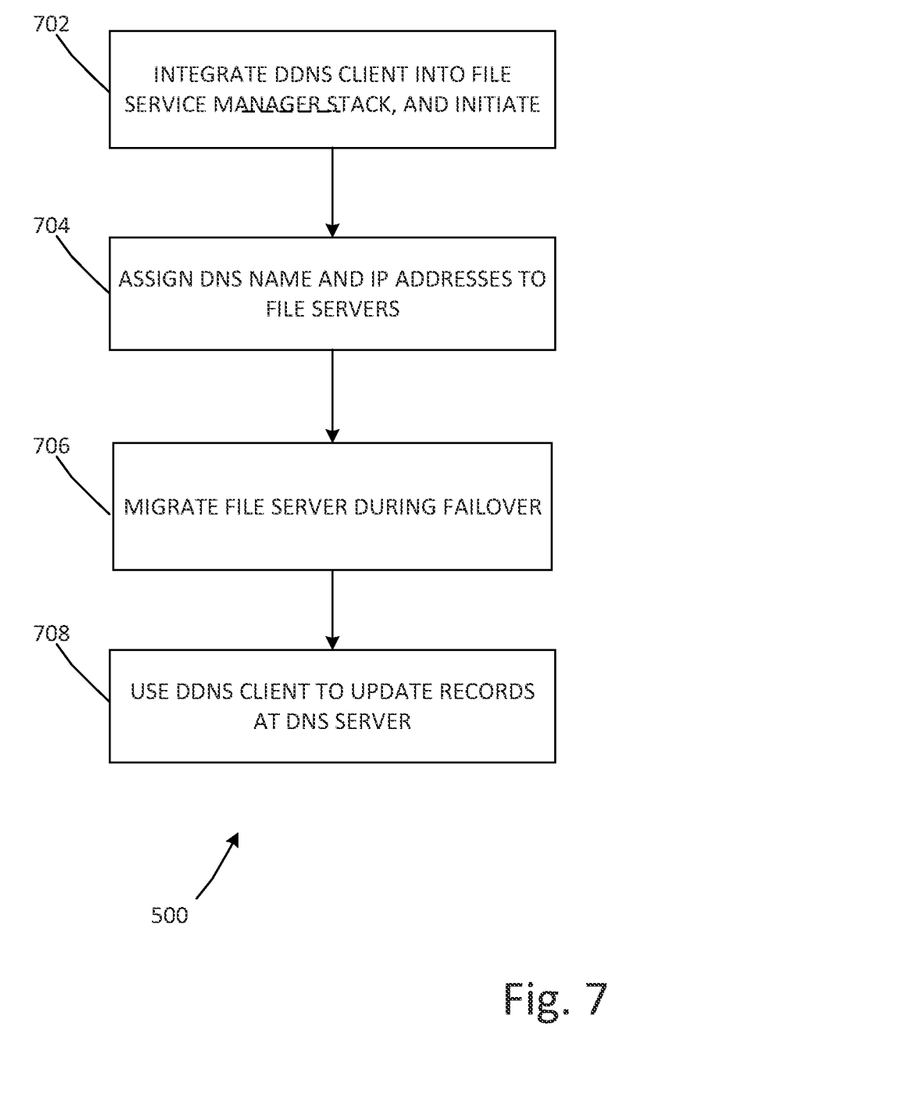
FIG. 7 is a flowchart of an example method to provide L3 networking support for failovers in a stretched cluster environment.

FIG. 7 is a flowchart that shows and explains the foregoing in further detail. More specifically, FIG. 7 is a flowchart of an example method 700 to provide L3 networking support for failovers in a stretched cluster environment.

At a block 702 ("INTEGRATE DDNS CLIENT INTO FILE SERVICE MANAGER STACK, AND INITIATE"), the DDNS client is integrated into the stack of the file service manager 614 at the secondary site 608. The DDNS client is initiated when the domain (including the domain name or DNS name) is created and registered with the A records at the DNS server 622.

At a block 704 ("ASSIGN DNS NAME AND IP ADDRESSES TO FILE SERVERS"), different IP addresses are assigned to the file servers at both the primary site 600 and the secondary site 608. For instance, the initial IP addresses of the NFS/SMB file servers 604 and 612 are configured with static IP addresses (one for primary and one for secondary) or through a dynamic host configuration protocol (DHCP) client. Also at the block 704, a specific file server (such as at the secondary site 608) is assigned to the DNS name such that this file server can be looked up using the DNS name instead of using the IP address.

At a block 706 ("MIGRATE FILE SERVER DURING FAILOVER"), the NFS/SMB file server 604 is migrated to the host 610 at the secondary site due to the failure of the host 602 at the primary site 600. Such a migration may involve, for example, migrating the container (or other virtualized computing instance that runs the file server) and/or the information/state/functionality of the container (including those of the NFS/SMB file server 604) to the host 610.

As previously explained above, a challenge is that the IP addresses (e.g., IP address A) of the NFS/SMB file server 604 from the failed host 602 may not work at the active host 610. Accordingly, a DDNS-based technique may be used to enable the NFS/SMB client 618 to access the migrated NFS/SMB file server 604 at the host 610.

First and as part of this migration/failover, the migrated NFS/SMB file server 604 can assume a new IP address that is operable with the subnet 2 of the secondary site 608 where the host 610 resides.

At a block 708 ("USE DDNS CLIENT TO UPDATE RECORDS AT DNS SERVER") and in response to the failover, the DDNS client at the stack of the file service manager 614 creates a new A record (or revises an existing A record) at the DNS server 622 so as to include the new IP address of the migrated NFS/SMB file server 604, with the A record mapping the new IP address to the DNS name. Such A record(s) thus being updated at the DNS server 622 enables the migrated NFS/SMB file server 604 to be accessed by the NFS/SMB client 618 using the DNS name even if the underlying IP address(es) has changed. For example, the IP address (e.g., the new IP address) of the migrated NFS/SMB file server 604 is provided by the DDNS client to the DNS server 622 when the failover happens, such that the new IP address of the migrated NFS/SMB file server 604 is associated/registered with the DNS name in the A record(s) at the DNS server 622. In this manner, when the NFS/SMB client 618 looks up the DNS name at the DNS server 622 to resolve the DNS name into an IP address, the DNS server 622 will return the new IP address of the migrated NFS/SMB file server 604 to the NFS/SMB client 618. The NFS/SMB client 618 can then use such IP address to access the migrated NFS/SMB file server 604 at the secondary site 608.

In some implementations, the DNS lease expiration can be handled by the management stack of the file service manager 614. This ensures that the DNS name/record can always be reserved by the specific file server.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1 to 7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment and/or storage nodes in distributed storage system), wherein it would be beneficial to provide site locality support for hosts in a stretched cluster environment.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to provide site locality support in a stretched cluster having hosts at different geographic locations, the method comprising:
   determining a site affinity setting of a file server;
   based on the determined site affinity setting and on a workload of a first host at a first site at a first geographic location, locating the file server and corresponding data path components at the first host, such that access by a client to a storage object at a distributed storage system traverses through the first site and avoids cross-site access to a second site;
   in response to a failure at the first host, performing a failover to migrate the file server and corresponding data path components from the failed first host to an active second host; and
   in response to restoration of the first host to be active, performing a failback to migrate the file server and at least some of the corresponding data path components from the active second host back to the restored first host, wherein the file server and the at least some of the corresponding data path components are migrated from the active second host to an active third host, instead of performing the failback to migrate from the active second host back to the restored first host, based on a guardrail that specifies an amount of tolerable disruption due to attempting the failback to migrate from the active second host back to the restored first host.

2. The method of claim 1, wherein:
   determining the site affinity setting of the file server includes determining that the site affinity setting of the file server indicates an affinity to the first site,
   locating the file server and corresponding data path components at the first host based on the workload of the first host includes determining that the first host has a lightest workload amongst hosts at the first site, and
   the workload is calculated based on a number of file shares at the first host.

3. The method of claim 1, wherein:
   determining the site affinity setting of the file server includes determining that the site affinity setting of the file server does not indicate an affinity to any particular site,
   locating the file server and corresponding data path components at the first host based on the determined site affinity setting and on the workload of the first host includes determining that the first host has a lightest workload amongst hosts of the cluster, and
   the workload is calculated based on a number of file shares at the first host.

4. The method of claim 1, wherein performing the failover in response to the failure of the first host includes migrating the file server and corresponding data path components from the failed first host to the active second host which is in the first site.

5. The method of claim 1, wherein performing the failover in response to the failure of the first host includes migrating the file server and corresponding data path components from the failed first host to the active second host which is at a second site at a second geographic location remote from the first geographic location, and wherein the file server and corresponding data path components are moved from the failed first host to the active second host if all hosts in the first site have failed.

6. The method of claim 1, further comprising:
   co-locating, at the first site, the file server and corresponding data path components with the client, wherein co-locating with the client at the first site is performed based on one or more rules that include:
   a change in workload at the first site, due to co-locating the client at the first site, is less than a threshold change in workload;
   a plurality of clients, including the client, that access the file server are located at the first site;
   the client is located at the first site and other clients that access the file server are located at the second site, and there is no open file handle for the file server; and
   a determination of an aggregate of traffic at each site, wherein the first site is determined to have highest traffic, and wherein co-location is performed after there are no open file handles.

7. The method of claim 1, further comprising performing a dynamic domain name system (DDNS)-based technique to enable the client to access the file server at the active second host using a DNS name associated with the file server.

8. A non-transitory computer-readable medium having instructions stored thereon, which in response to execution by one or more processors, cause the one or more processors of a host to perform or control performance of a method to provide site locality support in a stretched cluster having hosts at different geographic locations, wherein the method comprises:
 determining a site affinity setting of a file server;
 based on the determined site affinity setting and on a workload of a first host at a first site at a first geographic location, locating the file server and corresponding data path components at the first host, such that access by a client to a storage object at a distributed storage system traverses through the first site and avoids cross-site access to a second site;
 in response to a failure at the first host, performing a failover to migrate the file server and corresponding data path components from the failed first host to an active second host; and
 in response to restoration of the first host to be active, performing a failback to migrate the file server and at least some of the corresponding data path components from the active second host back to the restored first host, wherein the file server and the at least some of the corresponding data path components are migrated from the active second host to an active third host, instead of performing the failback to migrate from the active second host back to the restored first host, based on a guardrail that specifies an amount of tolerable disruption due to attempting the failback to migrate from the active second host back to the restored first host.

9. The non-transitory computer-readable medium of claim 8, wherein:
 determining the site affinity setting of the file server includes determining that the site affinity setting of the file server indicates an affinity to the first site,
 locating the file server and corresponding data path components at the first host based on the workload of the first host includes determining that the first host has a lightest workload amongst hosts at the first site, and
 the workload is calculated based on a number of file shares at the first host.

10. The non-transitory computer-readable medium of claim 8, wherein:
 determining the site affinity setting of the file server includes determining that the site affinity setting of the file server does not indicate an affinity to any particular site,
 locating the file server and corresponding data path components at the first host based on the determined site affinity setting and on the workload of the first host includes determining that the first host has a lightest workload amongst hosts of the cluster, and
 the workload is calculated based on a number of file shares at the first host.

11. The non-transitory computer-readable medium of claim 8, wherein performing the failover in response to the failure of the first host includes migrating the file server and corresponding data path components from the failed first host to the active second host which is in the first site.

12. The non-transitory computer-readable medium of claim 8, wherein performing the failover in response to the failure of the first host includes migrating the file server and corresponding data path components from the failed first host to the active second host which is at a second site at a second geographic location remote from the first geographic location, and wherein the file server and corresponding data path components are moved from the failed first host to the active second host if all hosts in the first site have failed.

13. The non-transitory computer-readable medium of claim 8, wherein the method further comprises:
 co-locating, at the first site, the file server and corresponding data path components with the client, wherein co-locating with the client at the first site is performed based on one of one or more rules that include:
  a change in workload at the first site, due to co-locating the client at the first site, is less than a threshold change in workload;
  a plurality of clients, including the client, that access the file server are located at the first site;
  the client is located at the first site and other clients that access the file server are located at the second site, and there is no open file handle for the file server; and
  a determination of an aggregate of traffic at each site, wherein the first site is determined to have highest traffic, and wherein co-location is performed after there are no open file handles.

14. The non-transitory computer-readable medium of claim 8, wherein the method further comprises:
 performing a dynamic domain name system (DDNS)-based technique to enable the client to access the file server at the active second host using a DNS name associated with the file server.

15. An arbitrator host to provide site locality support in a stretched cluster having hosts at different geographic locations, the arbitrator host comprising:
 one or more processors; and
 a non-transitory computer-readable medium coupled to the one or more processors, and having instructions stored thereon, which in response to execution by the one or more processors, cause the one or more processors to perform or control performance of operations that include:
  determine a site affinity setting of a file server;
  based on the determined site affinity setting and on a workload of a first host at a first site at a first geographic location, locate the file server and corresponding data path components at the first host, such that access by a client to a storage object at a distributed storage system traverses through the first site and avoids cross-site access to a second site;
  in response to a failure at the first host, perform a failover to migrate the file server and corresponding data path components from the failed first host to an active second host; and
  in response to restoration of the first host to be active, perform a failback to migrate the file server and at least some of the corresponding data path components from the active second host back to the restored first host, wherein the file server and the at least some of the corresponding data path components are migrated from the active second host to an active third host, instead of performing the failback to migrate from the active second host back to the restored first host, based on a guardrail that specifies an amount of tolerable disruption due to attempting the failback to migrate from the active second host back to the restored first host.

16. The arbitrator host of claim 15, wherein:
the operations to determine the site affinity setting of the file server includes operations to determine that the site affinity setting of the file server indicates an affinity to the first site,
the operations to locate the file server and corresponding data path components at the first host based on the workload of the first host includes operations to determine that the first host has a lightest workload amongst hosts at the first site, and the workload is calculated based on a number of file shares at the first host.

17. The arbitrator host of claim 15, wherein:

the operations to determine the site affinity setting of the file server includes operations to determine that the site affinity setting of the file server does not indicate an affinity to any particular site, the operations to locate the file server and corresponding data path components at the first host based on the determined site affinity setting and on the workload of the first host includes operations to determine that the first host has a lightest workload amongst hosts of the cluster, and the workload is calculated based on a number of file shares at the first host.

18. The arbitrator host of claim 15, wherein the operations to perform the failover in response to the failure of the first host includes operations to migrate the file server and corresponding data path components from the failed first host to the active second host which is in the first site.

19. The arbitrator host of claim 15, wherein the operations to perform the failover in response to the failure of the first host includes operations to migrate the file server and corresponding data path components from the failed first host to the active second host which is at a second site at a second geographic location remote from the first geographic location, and wherein the file server and corresponding data path components are moved from the failed first host to the active second host if all hosts in the first site have failed.

20. The arbitrator host of claim 15, wherein the operations further include:

co-locate, at the first site, the file server and corresponding data path components with the client, wherein co-location of the client at the first site is performed based on one or more rules that include:

a change in workload at the first site, due to co-location of the client at the first site, is less than a threshold change in workload;

a plurality of clients, including the client, that access the file server are located at the first site;

the client is located at the first site and other clients that access the file server are located at the second site, and there is no open file handle for the file server; and a determination of an aggregate of traffic at each site, wherein the first site is determined to have highest traffic, and wherein co-location is performed after there are no open file handles.

21. The arbitrator host of claim 15, wherein the operations further include:

perform a dynamic domain name system (DDNS)-based technique to enable the client to access the file server at the active second host using a DNS name associated with the file server.

* * * * *